United States Patent
Lewis

(10) Patent No.: US 9,846,459 B2
(45) Date of Patent: Dec. 19, 2017

(54) SHIELD FOR AN ELECTRONIC DEVICE

(71) Applicant: HEWLETT-PACKARD DEVELOPMENT COMPANY, L.P., Houston, TX (US)

(72) Inventor: John Lewis, Sunnyvale, CA (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/780,686

(22) PCT Filed: Mar. 28, 2013

(86) PCT No.: PCT/US2013/034272
§ 371 (c)(1),
(2) Date: Sep. 28, 2015

(87) PCT Pub. No.: WO2014/158159
PCT Pub. Date: Oct. 2, 2014

(65) Prior Publication Data
US 2016/0062418 A1    Mar. 3, 2016

(51) Int. Cl.
| G06F 1/18 | (2006.01) |
| H05K 9/00 | (2006.01) |
| G06F 1/20 | (2006.01) |
| H05K 1/03 | (2006.01) |
| H05K 1/09 | (2006.01) |

(52) U.S. Cl.
CPC ............ *G06F 1/182* (2013.01); *G06F 1/20* (2013.01); *H05K 1/032* (2013.01); *H05K 1/09* (2013.01); *H05K 9/0024* (2013.01); *H05K 2201/0108* (2013.01); *H05K 2201/0329* (2013.01)

(58) Field of Classification Search
CPC .... H05K 9/0007; H05K 9/002; H05K 9/0024; H05K 9/003; H05K 9/0032; H05K 9/0041; H05K 9/0045; H05K 9/0047; H05K 9/005; H05K 9/0083; H05K 5/03; H05K 5/04; H05K 5/069; H05K 9/00
See application file for complete search history.

(56) References Cited

U.S. PATENT DOCUMENTS

| 4,860,351 A | 8/1989 | Weingart |
| 5,159,629 A | 10/1992 | Double et al. |
| 5,539,150 A * | 7/1996 | Kipka ................. H05K 9/0049 174/350 |

(Continued)

FOREIGN PATENT DOCUMENTS

| EP | 1184773 | 3/2002 |
| EP | 1045352 A1 | 10/2002 |

(Continued)

OTHER PUBLICATIONS

International Search Report and Written Opinion, dated Dec. 20, 2013, Patent Application No. PCT/US2013/034272, 11 pages.

(Continued)

*Primary Examiner* — Hoa C Nguyen
*Assistant Examiner* — Christopher L Augustin

(57) ABSTRACT

Example embodiments relate to a shield for an electronic device. The shield may be shaped to enclose the electronic device. The shield may include a number of traces. Each trace may include an electrically conductive inner portion and an electrically non-conductive outer portion.

10 Claims, 11 Drawing Sheets

(56) References Cited

U.S. PATENT DOCUMENTS

| | | | |
|---|---|---|---|
| 5,786,562 A | 7/1998 | Laron | |
| 6,218,610 B1* | 4/2001 | Suzuki | H01L 23/552 174/377 |
| 6,323,418 B1* | 11/2001 | Tiburtius | H05K 9/0015 174/363 |
| 6,410,847 B1* | 6/2002 | Allen | H01L 23/552 174/390 |
| 6,426,459 B1* | 7/2002 | Mitchell | H05K 9/0041 174/382 |
| 6,570,086 B1* | 5/2003 | Shimoji | H05K 9/0024 174/377 |
| 7,291,364 B2 | 11/2007 | Faulkner et al. | |
| 7,814,862 B2 | 10/2010 | Lennon et al. | |
| 8,333,456 B2 | 12/2012 | Silverbrook | |
| 2002/0002683 A1 | 1/2002 | Benson et al. | |
| 2002/0029893 A1* | 3/2002 | Toyoda | H01Q 1/526 174/377 |
| 2003/0155987 A1 | 8/2003 | Kolb et al. | |
| 2004/0179346 A1* | 9/2004 | Brooks | H05K 9/0084 361/818 |
| 2004/0239650 A1* | 12/2004 | Mackey | G06F 3/044 345/174 |
| 2005/0045358 A1* | 3/2005 | Arnold | H05K 9/0024 174/51 |
| 2006/0096778 A1* | 5/2006 | Yun | H01M 10/425 174/255 |
| 2007/0205019 A1* | 9/2007 | Holmberg | H05K 9/0032 174/377 |
| 2009/0094700 A1* | 4/2009 | Goto | G06F 21/86 726/26 |
| 2010/0089627 A1* | 4/2010 | Huang | H05K 1/0284 174/258 |
| 2011/0031982 A1 | 2/2011 | Leon et al. | |
| 2011/0176279 A1 | 7/2011 | Zhao et al. | |

FOREIGN PATENT DOCUMENTS

| | | |
|---|---|---|
| EP | 2505047 A2 | 10/2012 |
| JP | 2000-234104 | 8/2000 |
| JP | 2002-229857 | 8/2002 |
| JP | 2002-287060 | 10/2002 |
| JP | 2008-065401 | 3/2008 |
| JP | 2009-093401 | 4/2009 |
| JP | 2010-541028 | 12/2010 |
| KR | 2011-0082867 A | 7/2011 |
| WO | WO-03/012606 | 2/2003 |
| WO | WO-2012033837 A2 | 3/2012 |

OTHER PUBLICATIONS

Leigh, S.J., et al., A Simple, Low-Cost Conductive Composite Material for 3D Printing of Electronic Sensors, Nov. 2012, PLOS One, vol. 7, Issue 11, 6 pages.

European Patent Office, "Extended European Search Report", 13880407.5, dated Nov. 25, 2016, 10 pages.

\* cited by examiner

SHIELD FOR AN ELECTRONIC DEVICE

BACKGROUND

Security products are commonly used in banking and financial applications. Certain industry and governmental standards require a security barrier to be provided for computer components that encrypt and decrypt sensitive data. For example, when a personal identification number is entered at an automated teller machine, the entered information may pass through a security barrier. The security barrier provides intrusion detection so that countermeasures may be taken to prevent unauthorized access to the sensitive data.

BRIEF DESCRIPTION OF THE DRAWINGS

The following detailed description references the drawings, wherein.

DETAILED DESCRIPTION

Figure 1:
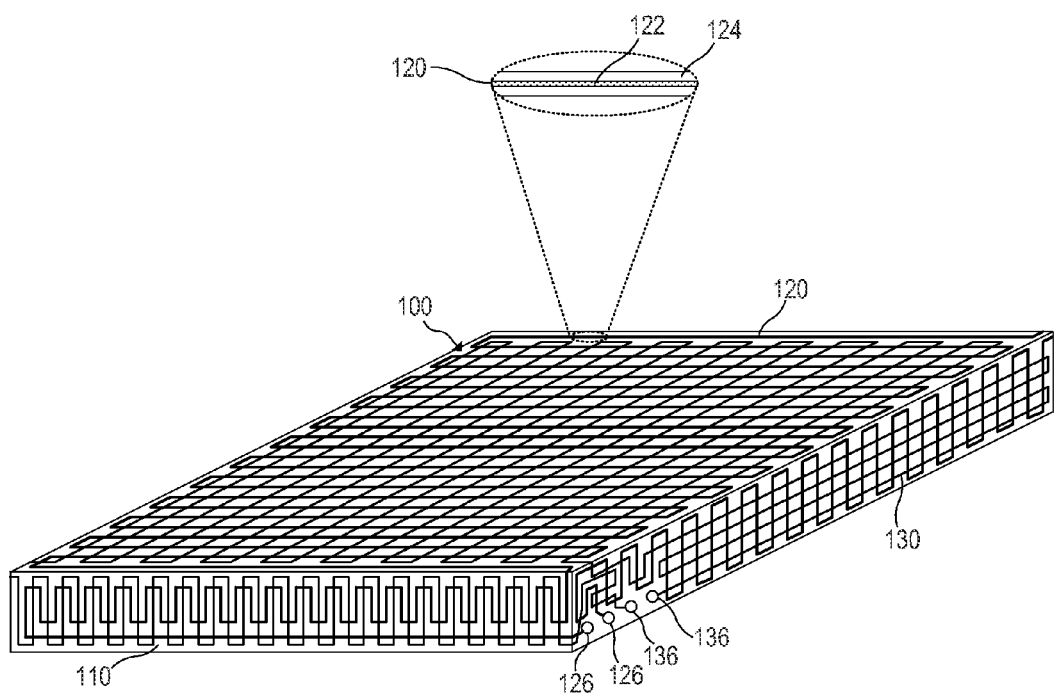
FIG. 1 is a perspective view of an example shield provided around an electronic device with an enlarged, cross-sectional view of an example trace of the shield.

Existing security barriers may be provided as a metal box surrounded by a thin, flexible printed circuit board. The printed circuit board is folded around the metal box so that a penetration that is made by an external source through the printed circuit board may be detectable. Such a structure is expensive to manufacture and any heat generated by electronic components within the metal box is difficult to dissipate because material used in a sensing layer of the printed circuit board is not a good conductor of heat. Accordingly, any processors within the metal box may be operated at a slower rate because the processors cannot be adequately cooled. If an attempt was made to operate the processors at full speed, the processors may become inoperable due to excessive heat.

Example embodiments disclosed herein address these issues by providing a shield that includes traces where each trace includes an inner-conductive portion and an outer non-conductive portion. In some implementations, the traces may be generated using three-dimensional printing techniques. The shield is used to provide an electronic device with a security barrier. Three-dimensional printing may be used to generate the shield more cheaply than conventional techniques. A three-dimensional printer may generate the shield using conductive inks and conductive plastics such that the traces include conductive plastic embedded within non-conductive plastic.

With three-dimensional printing technology, the size and shape of the shield is not limited. Accordingly, the shield may be form-fitted to encase all components on a circuit board or to enclose an object having an arced or rounded surface. In addition, air channels may be created within the shield. The shield provides penetration protection because, if someone tries to penetrate the shield, contact may be made with at least one of the traces thereby signaling that the shield is being tampered with.

The shield may also be generated with thermally conductive plastic. Accordingly, thermal coupling may be provided between the shield and a heat generating electronic component, such as a processor. The processor may generate a significant amount of heat such that the thermally conductive plastic of the shield may be used as a heat sink. The heat sink feature of the shield allows the processor to operate at a high rate while reducing overheating.

In this manner, example embodiments disclosed herein provide a shield for providing an electronic device with a security barrier. The shield includes a number of traces where each trace includes an inner conductive portion and an outer non-conductive portion. The traces may be generated using three-dimensional printing techniques such that each trace includes electrically conductive plastic as the inner portion and an electrically non-conductive plastic as the outer portion. The traces are arranged such that the shield is shaped to enclose the electronic device.

With this approach, the traces may be arranged in a pattern to detect penetration of the shield from a source external to the shield. For example, a resistance of the conductive portion of a trace changes in response to contact from a source external to the shield. In the event that a source external to the shield is detected as attempting to penetrate the shield, a memory of the electronic device is caused to be erased.

Referring now to the drawings, FIG. 1 is a perspective view of an example shield 100 provided around an electronic device 110 with an enlarged, cross-sectional view of an example trace 120 of shield 100. Shield 100 may be any structure that is designed to surround or otherwise protect another object. For example, shield 100 may be shaped to enclose electronic device 110. In the implementation of FIG. 1, shield includes trace 120 and trace 130. Although shield 100 is described with references to traces 120, 130, it is understood that shield 100 may include a larger number of traces.

Traces 120, 130 may be generated using a three-dimensional printer. Each trace 120, 130 may be arranged such that electronic device 110 is surrounded by and enclosed within traces 120, 130. A three-dimensional printer may generate a three-dimensional structure with different materials. In one example embodiment, trace 120 may be generated to have an inner portion 122 and an outer portion 124. Inner portion 122 may be generated using an electrically conductive ink while outer portion 124 may be generated using a different material that results in a non-conductive plastic covering being formed around inner portion 122. Trace 130 is similarly constructed to have an electrically conductive inner portion and a non-conductive outer portion. Each trace 120, 130 is provided with terminals 126, 136 to connect traces to a controller, as discussed below.

Three-dimensional printing techniques allow for flexibility in generating the shape of shield 100. As shown in FIG. 1, shield 100 is generated to surround an essentially box-shaped electronic device 110. However, as discussed below, shield 100 may be generated to be any shape that is used to provide a security barrier to any type of electronic device or combination of devices, such as those provided on a printed circuit board. Shield 100 may also be generated to enclose objects having unconventional shapes such as those having rounded or arced surfaces.

As shown in FIG. 1, traces 120, 130 are provided to surround electronic device 110 in a pattern such that traces 120, 130 are each arranged in a number of straight lines and each trace 120, 130 crosses the other trace at an angle of essentially ninety degrees. It is understood that this type of pattern is one of many that may be used to have shield 100 surround electronic device 110. For example, traces 120, 130 may be arranged in a pattern of curved or arced lines. In another example, traces 120, 130 may be arranged such that each trace crosses over itself at least once. In a further example, traces 120, 130 may overlap each other repeatedly such that multiple layers of traces are provided that extend in different directions. Any pattern may be generated using three-dimensional printing techniques to provide any number of layers of traces 120, 130. The actual pattern used to enclose electronic device 110 with traces 120, 130 is not as important as ensuring that traces 120, 130 essentially surround electronic device 110. The pattern is selected such that an external source cannot penetrate shield 100 from any angle of intrusion without contacting at least one of traces 120, 130.

Figure 2:
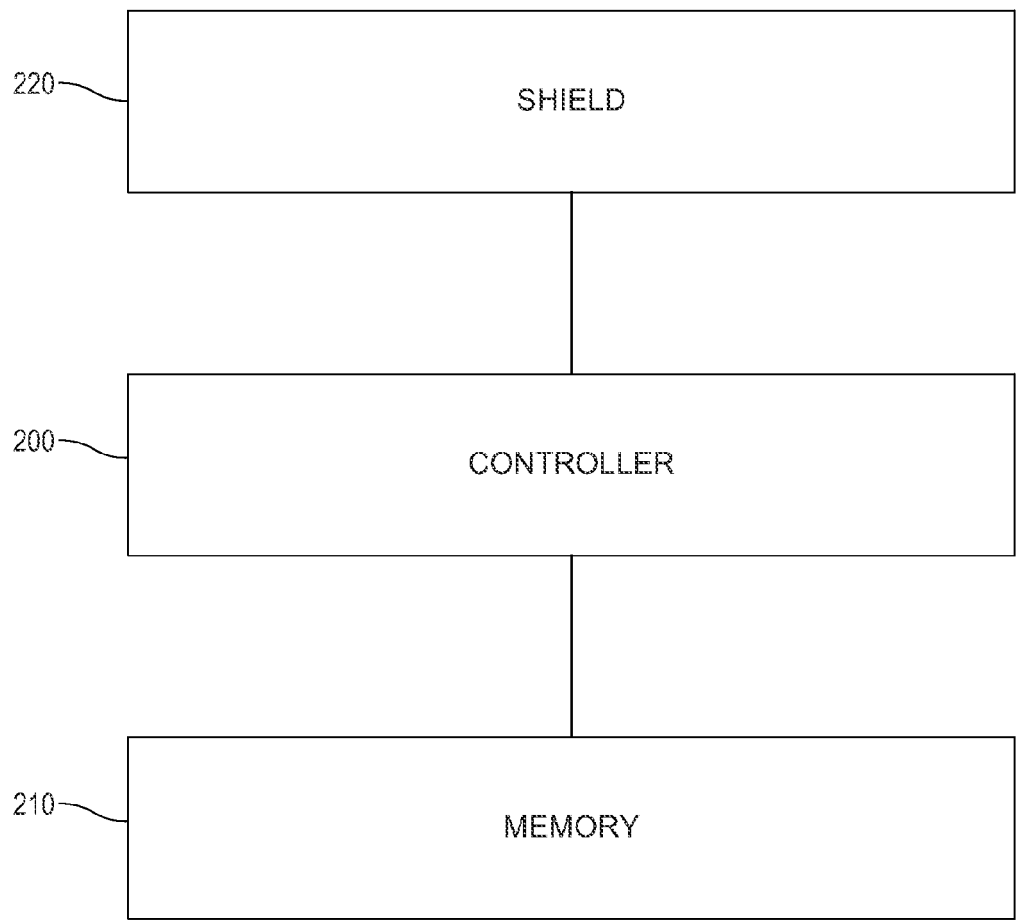
FIG. 2 is a block diagram of an example controller, an example memory and an example shield.

FIG. 2 is a block diagram of an example controller 200, an example memory 210 and an example shield 220. Controller 200 may be coupled to memory 210 and shield 220. Memory 210 may be included within electronic device 110 such that the traces of shield 220 are arranged in a pattern to enclose electronic device 110. In an example embodiment, controller 200 may also be included within electronic device 110. Alternatively, controller 200 may be provided external to electronic device 110 such that controller 200 is not enclosed within shield 220.

Controller 200 may be one or more central processing units (CPUs), microprocessors, and/or other hardware devices suitable for causing memory 210 to be erased when shield penetration is detected. Memory 210 may be any electronic, magnetic, optical, or other physical storage device that stores data. Thus, memory 210 may be, for example, an Electrically-Erasable Programmable Read-Only Memory (EEPROM), a storage drive, an optical disc, and the like. As discussed in detail below, when the traces detect penetration of shield 220 from an external source, controller 200 causes memory 210 to be erased such that sensitive data cannot be accessed from memory 210.

Figure 3:
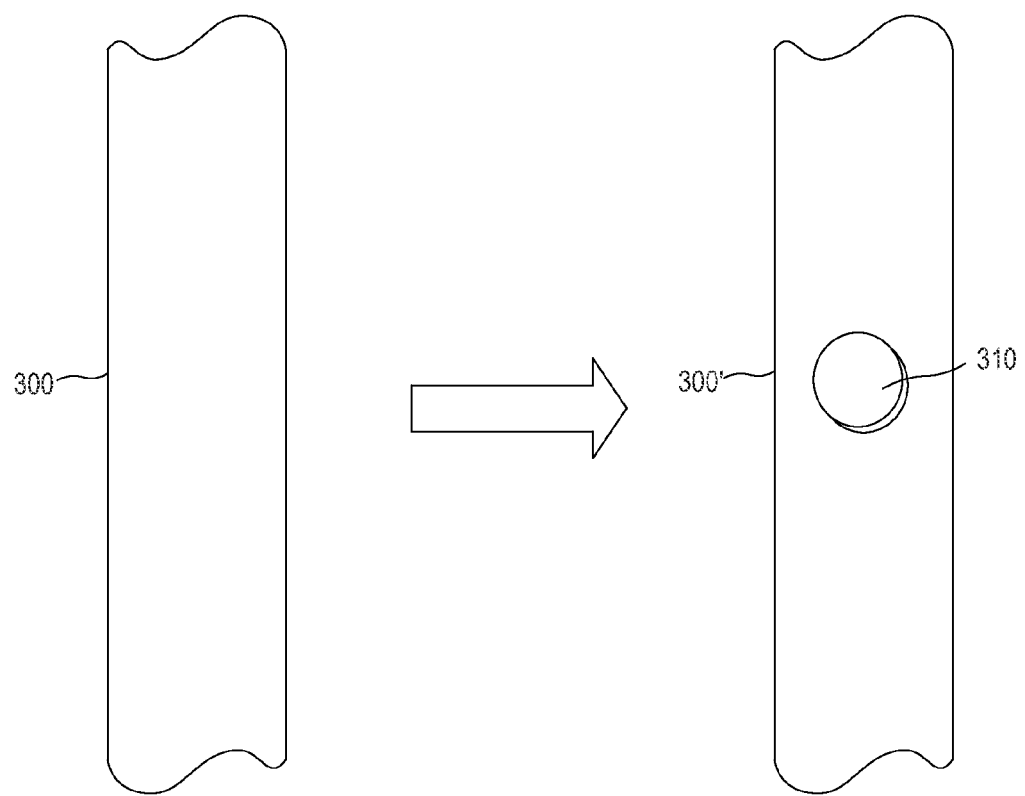
FIG. 3 is a partial view of an example trace of a shield before and after an external source causes a hole to be formed in the trace.

FIG. 3 is a partial view of an example trace of a shield before and after an external source causes a hole 310 to be formed in the trace. Trace 300 illustrates a portion of the shield before any penetration, and trace 300' illustrates the portion of the shield after penetration resulting in hole 310. Hole 310 may be caused by an external source attempting to drill through and puncture the shield to access electronic device 110.

Controller 200 may sense resistance changes in traces 300, 300' due to the puncture attempt. Traces 300, 300' may be constructed with plastic that has a resistance such that a penetration would result in a change of resistance that could be easily detected. In one example, hole 310 may be large enough to cause the inner conductive portion of trace 310' to break such that controller 200 detects the breakage and, in response, causes at least a portion of memory 210 to be erased. Accordingly, an intruder attempting to penetrate shield 100 would be prevented from accessing memory 210.

In another example, the inner conductive portion of trace 300 may have a known resistance per unit length. Illustratively, if trace 300 is ten centimeters long and one centimeter wide and has a resistance of 10 kΩ, drilling hole 310 may result in a drop in resistance of approximately 70Ω in trace 310'. Controller 200 may detect this drop in resistance. In response to such a drop in resistance, controller 200 may cause at least a portion of memory 210 to be erased such that access to data in memory 210 is prevented.

Figure 4:
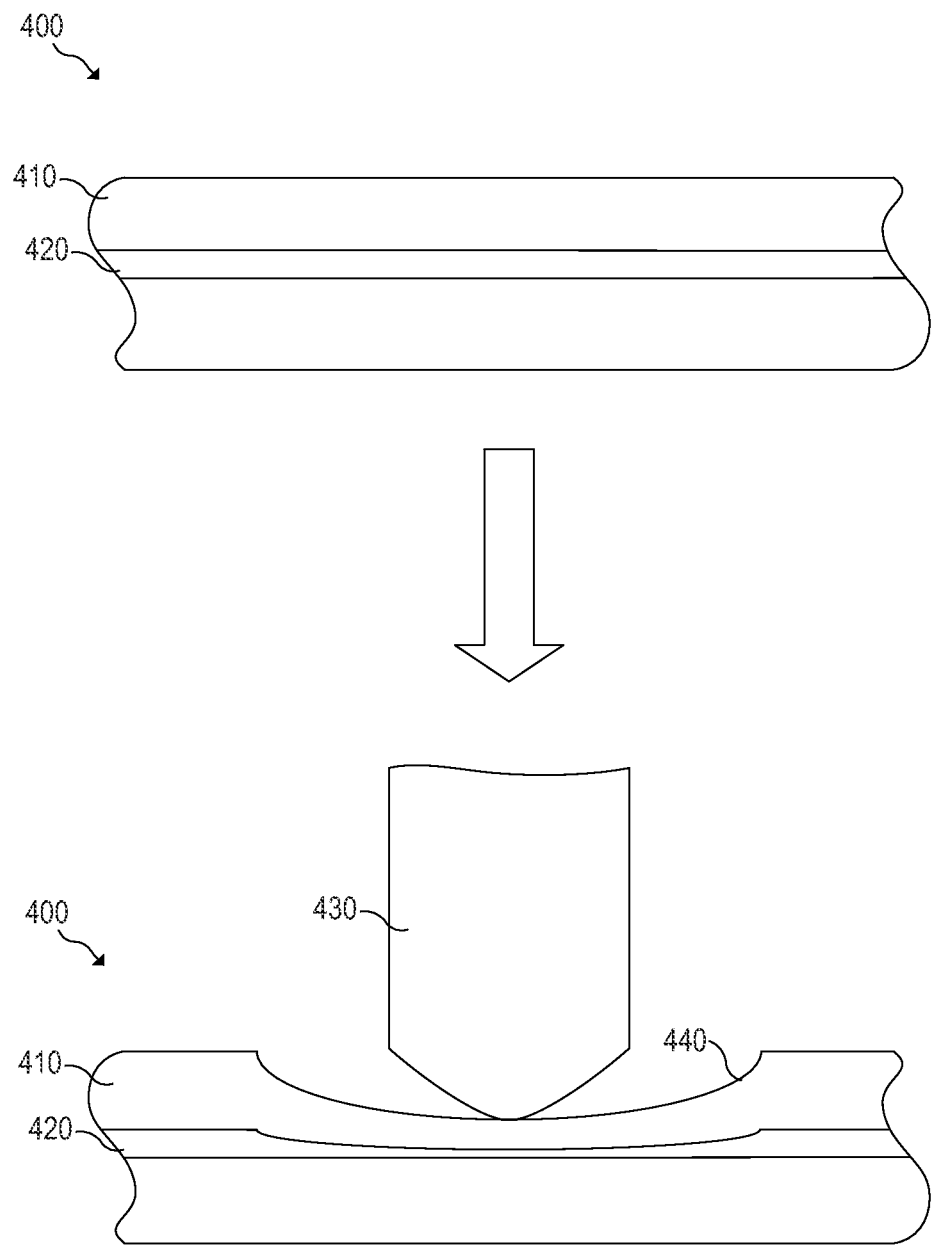
FIG. 4 is a partial view of an example trace of a shield before and after an external source applies pressure to the trace.

FIG. 4 is a partial view of an example trace of a shield before and after an external source applies pressure to the trace. Trace 400 is illustrated as a cross sectional view to show an outer non-conductive portion 410 and an inner conductive portion 420. An attempt may be made to penetrate shield using brute force penetration. In such a case, someone may attempt to punch through the shield using, for example, a pointed object 430 to access or retrieve at least a portion of electronic device 110 believed to store sensitive data. For example, an intruder may attempt to physically remove electronic device 110 before controller 200 has an opportunity to erase memory 210.

Pointed object 430 may apply pressure to trace 400 causing a width of trace 400 to decrease and deforming both the outer non-conductive portion 410 and the inner conductive portion 420. In response to the applied pressure, the inner conductive portion 420 may change resistivity due to its piezoresistive characteristics. The change in resistivity may be detected by controller 200. In response to the change in resistivity, controller 200 may cause at least a portion of memory 210 to be erased.

Figure 5:
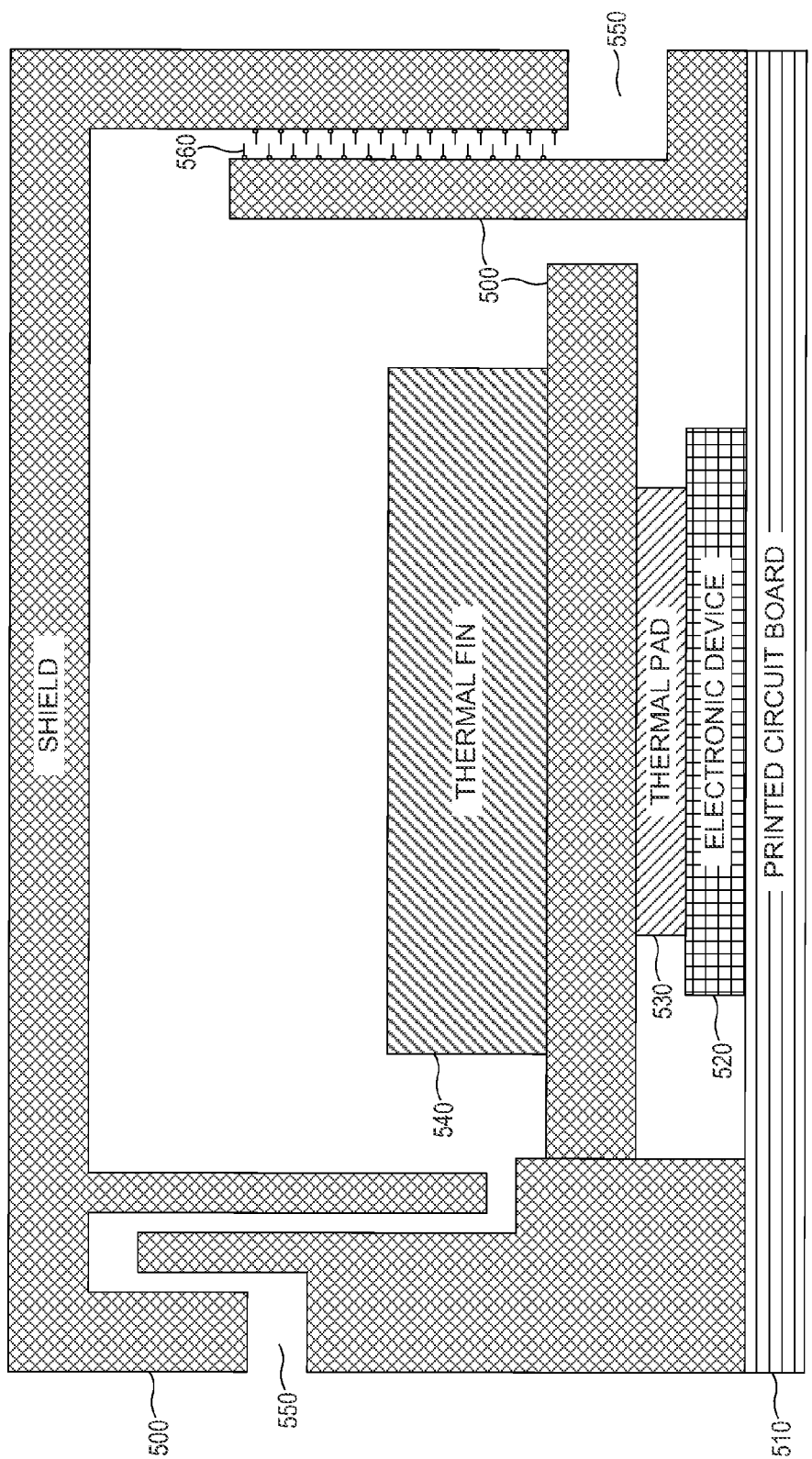
FIG. 5 is a cross-sectional view of an example shield provided on a printed circuit board.

FIG. 5 is a cross-sectional view of an example shield 500 provided on a printed circuit board 510. Shield 500 is indicated by a cross-hatched pattern. Three-dimensional printing techniques allow for shield 500 to be constructed by printing the traces in multiple layers such that shield 500 may be any three-dimensional shape.

Shield 500 may be attached to printed circuit board 510. Electronic device 520 is also provided on printed circuit board 510. Thermally conductive material may be attached to an interior of shield 500. For example, a thermal pad 530 may be provided between electronic device 520 and shield 500, and a thermal fin 540 may be provided on shield 500. Shield 500 may also be provided with air holes 550 such that air may flow through an interior of shield 500. Louvers 560 may be provided on an internal surface of air hole 550. Louvers 560 may be generated in conjunction with the traces of shield 500 using three-dimensional printing techniques.

Air holes 550, thermal pad 530 and thermal fin 540 promote the dissipation of heat through shield 500. As previously stated, shield 500 may include thermally conductive material such that heat generated by electrical device 520 may be dissipated by shield 500 through thermal pad 530. Thermal fin 540 may dissipate additional heat from shield 500 to an interior of shield 500. Air holes 550 allow cool air external to shield 500 to pass through an interior of the shield 500 and then out of shield 500. In some cases, air holes 550 may provide a probe with access to sensitive data stored in electronic device 520.

In order to prevent such an intrusion, shield 500 is constructed such that access to the interior of shield 500 cannot be easily gained through air holes 550. As shown in FIG. 5, air holes 550 are provided with multiple ninety degree angles that a probe would need to maneuver around in order to gain access to the interior of shield 500. Using three-dimensional printing techniques, such air holes 550 may be easily created for ease of air flow through shield 500. Such a configuration may also prevent an intruder from inserting a thin wire through air holes 550 and into the interior of shield 500.

To further inhibit wire insertion into the interior of shield 500, louvers 560 may be provided on a surface of air hole 550. Louvers 560 may be hinged using three-dimensional printing techniques. The hinged louvers may trap a wire inserted into air hole 550 such that the wire is prevented from entering the interior of shield 500. Louvers 560 may also trap a wire inserted through air hole 550 such that once the wire is inserted through air hole 550, the wire may be prevented from being removed.

Thus far, the shield has been described to include traces made of both conductive and non-conductive plastic material. For some environments, plastic alone may not provide sufficient protection from penetration and intrusion into an interior of the shield. In other cases, more thermal conductivity may be necessary in addition to the properties provided by the shield in order to effectively dissipate heat. In order to provide more mechanical protection and additional thermal conductivity, a metal shell may be provided over the plastic shield.

Figure 6:
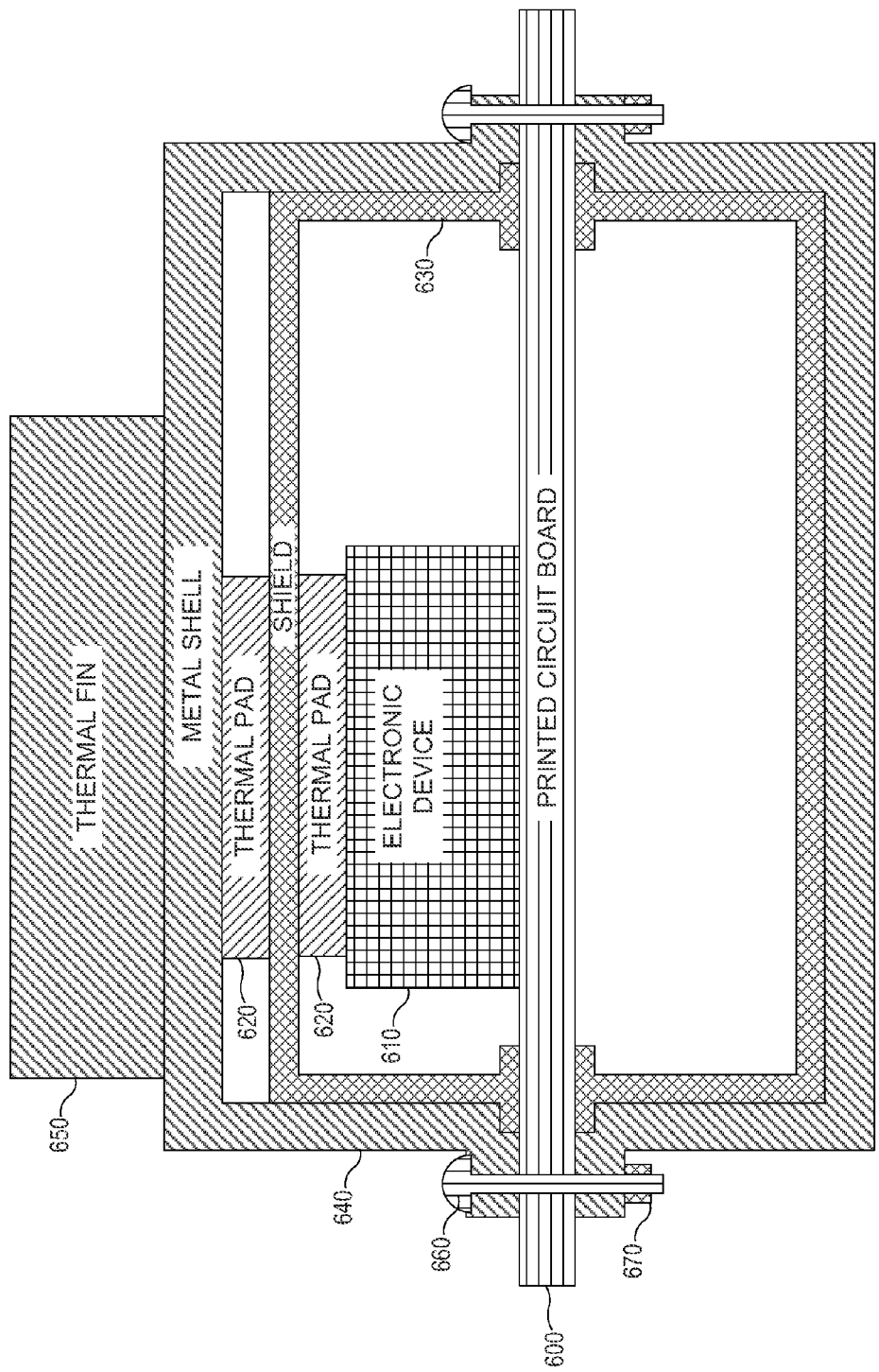
FIG. 6 is a cross-sectional view of an example shield and an example metal shell provided on a printed circuit board.

FIG. 6 is a cross-sectional view of an example shield 630 and an example metal shell 640 provided on a printed circuit board 600. An electronic device 610 may be provided on printed circuit board 600. One thermal pad 620 may be provided between electronic device 610 and shield 630, and another thermal pad 620 may be provided between electronic device 610 and metal shell 640. A thermal fin 650 may be provided on an exterior of metal shell 640. For enhanced security, metal shell 640 may be attached to printed circuit board 600 using bolt 660 and nut 670, and an additional layer of intruder detection may be provided by using contacts (not shown) to sense removal of metal shell 640 from printed circuit board 600.

Shield 630 is provided within metal shell 640. Shield 630 may be thermally coupled to electronic device 610 using thermally conductive material such as thermal pad 620 or thermal grease (not shown). Metal shell 640 may be thermally coupled to shield 630 using thermally conductive material such as thermal pad 620 or thermal grease (not shown). Metal shell 640 may also be directly thermally coupled to shield 630 as shown on the vertical sides of metal shell 640 and shield 630. In the structure illustrated in FIG. 6, cooling due to thermal conductivity is enhanced by the presence of metal shell 640, thermal fin 650, and thermal pads 620.

Figure 7:
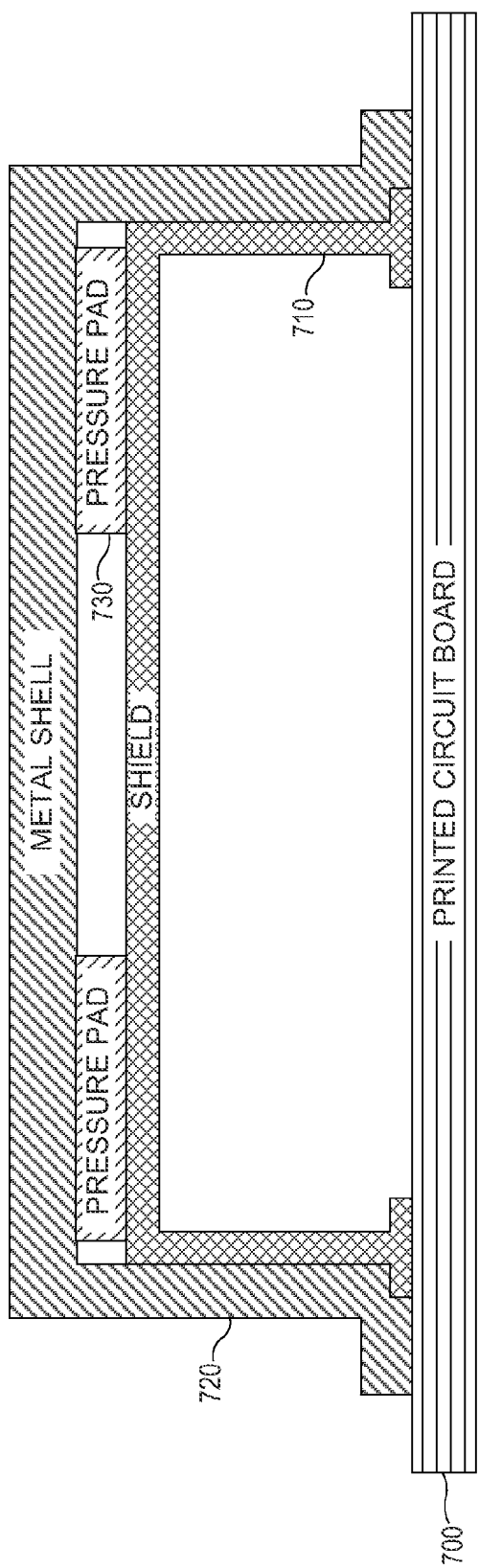
FIG. 7 is a cross-sectional view of an example shield and an example metal shell provided on a printed circuit board.

FIG. 7 is a cross-sectional view of an example shield 710 and an example metal shell 720 provided on a printed circuit board 700. Pressure-sensitive material such as pressure pads 730 may be provided between shield 710 and metal shell 720. Each pressure pad 730 may apply a measurable amount of pressure to shield 710 due to the piezoresistive characteristic of the traces in shield 710, as described above with reference to FIG. 4. If metal shell 720 is removed, or if an attempt is made to remove metal shell 720, the pressure applied to shield 710 may be changed resulting in a change of resistance in the traces of shield 710. In response to the change in resistance caused by the change in pressure at pressure pads 730, controller 200 may cause memory 210 to be erased.

In an example embodiment, pressure pads 730 may include electrically conductive material. In this case, pressure pads 730 may be constructed as a part of metal shell 720. The electrically conductive property of pressure pads 730 may allow a simple electrical connection to be formed between pressure pads 730, metal shell 720 and controller 200 such that any tampering with metal shell 720 may be detected in response to the connection being shorted or otherwise compromised.

Figure 8:
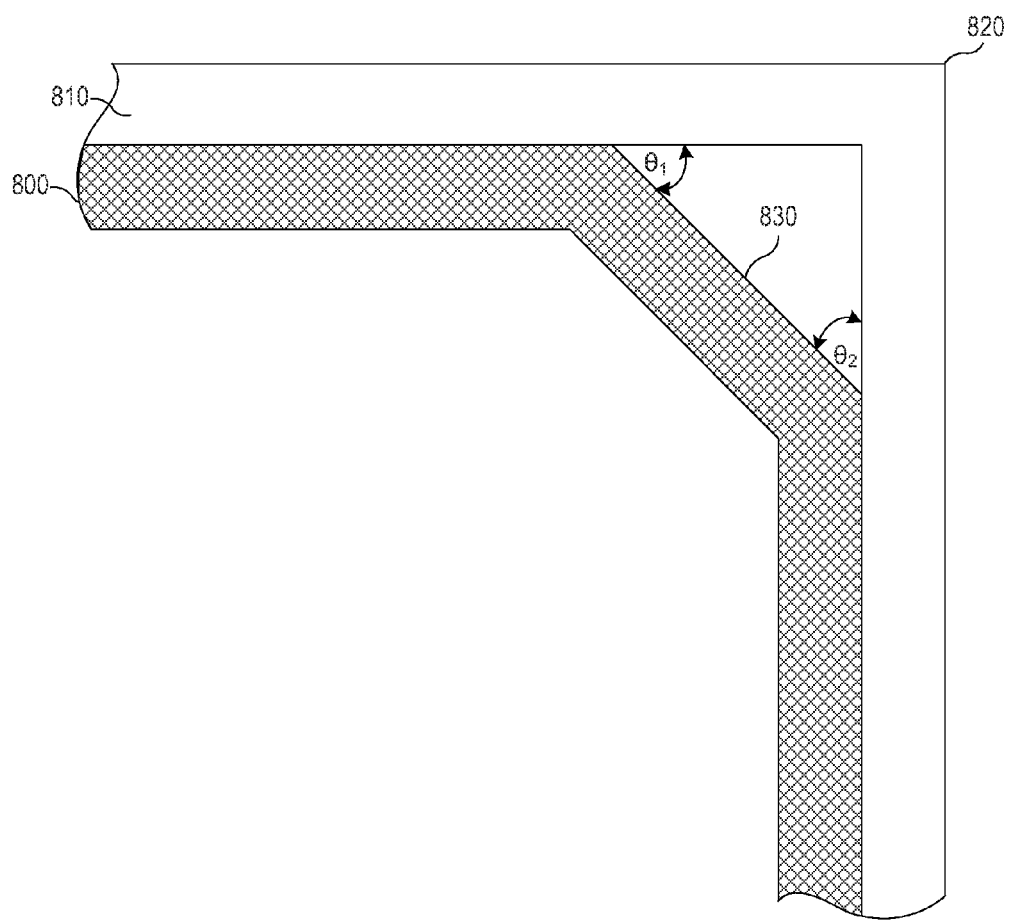
FIG. 8 is a partial, cross-sectional view of an example shield provided at an edge of an example metal shell.

FIG. 8 is a partial, cross-sectional view of an example shield 800 provided at an edge 820 of an example metal shell 810. In conventional security barriers where traces are provided on a flexible circuit board, a weak spot may exist at an edge of an electronic device such that the security barrier is susceptible to penetration at the edge. The susceptibility is due to the inability of the flexible circuit board from adequately covering the electronic device at an edge to prevent intrusion by an external source. For example, traces on the flexible circuit board may break when the security barrier is folded at the edge.

As shown in FIG. 8, shield 800 is provided within metal shell 810. A surface 830 is formed on shield 800 proximate edge 820. Surface 830 extends at angles $\theta_1$ and $\theta_2$ from an interior surface of metal shell 810. Such a structure forms a space between surface 830 and the interior surface of metal shell 810 along edge 820.

In FIG. 8, edge 820 is formed at a substantially ninety degree angle where two sides of metal shell 810 meet. In this case, values of angles $\theta_1$ and $\theta_2$ may be in a range of between thirty-five degrees and fifty-five degrees. With this structure, surface 830 of shield 800 may prevent an intrusion into shield 800 from edge 820 of metal shell 810 since an intruding device entering at edge 820 would contact the traces of shield 800 substantially perpendicular to surface 830.

In other example embodiments, edge 820 may be provided at an angle other than ninety degrees or may be rounded. Angles $\theta_1$ and $\theta_2$ may be provided with values that most effectively prevent intrusion from edge 820 into shield 800 by forming surface 830 to be substantially perpendicular to a line of entry of an intruding device into shield 800 from edge 820. In some implementations, surface 830 may also be rounded to conform to the shape of a rounded edge. Shield 800 having surface 830 is described in FIG. 8 with reference to metal she 810. However, it is understood that shield 800 may be formed with surface 830 without metal she 810 enclosing shield 800. The structure shown in FIG. 8 may be extended to prevent penetration of an intruding device at a corner of the metal shell, as illustrated in FIG. 9.

Figure 9:
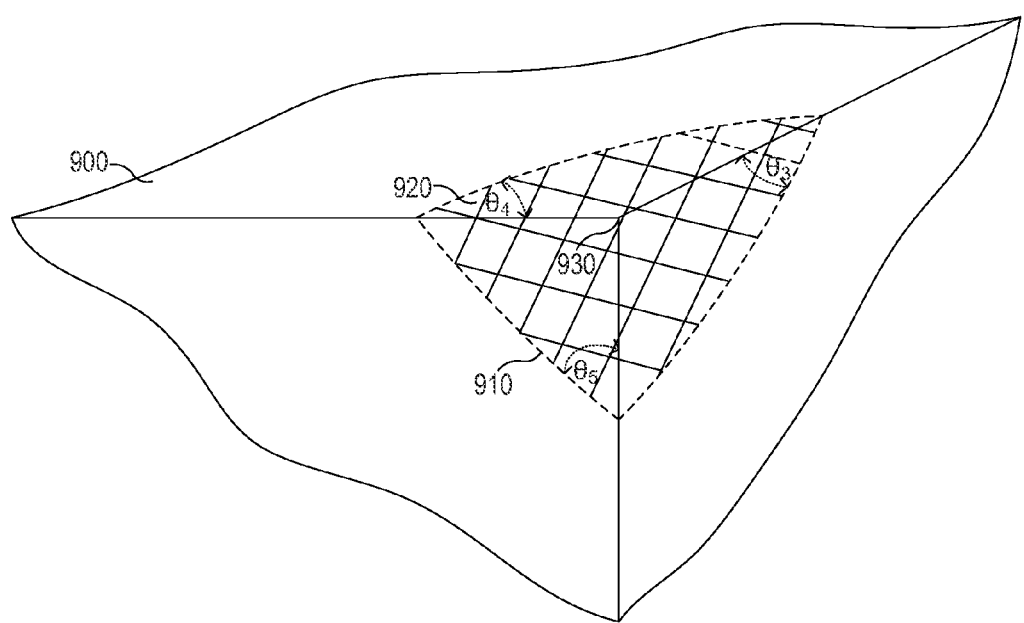
FIG. 9 is a partial, perspective view of an example shield provided at a corner of an example metal shell.

FIG. 9 is a partial, perspective view of an example shield 910 provided at a corner 930 of an example metal shell 900. One of the weakest points in a conventional security barrier is at a corner of the security barrier. Corners are notoriously difficult areas to detect penetration because a conventional flexible circuit board security barrier is commonly folded around a corner. By folding the flexible circuit board around a corner in multiple directions, traces on the flexible circuit board may break thereby allowing an intruding device to easily penetrate the security barrier undetected at the corner.

As shown in FIG. 9, shield 910 may be constructed such that a surface 920 of shield 910 is formed proximate corner 930 at an interior of metal shell 900. Surface 920 forms angles $\theta_3$, $\theta_4$, $\theta_5$ between surface 920 and each interior surface of metal shell 900 proximate corner 930. In FIG. 9, each side of metal shell 900 extends substantially perpendicular to corner 930. In this case, angles $\theta_3$, $\theta_4$, $\theta_5$ may be in a range of between thirty-five degrees and fifty-five degrees. With this structure, surface 920 of shield 910 may prevent an intrusion into shield 910 from corner 930 of metal shell 900 since an intruding device entering at corner 930 would contact the traces from a direction that is essentially perpendicular to shield 920.

In other example embodiments, corner 930 may be formed by three sides of metal shell 900 where the three sides are not perpendicular to each other, or corner 930 may be rounded. In this case, angles $\theta_3$, $\theta_4$, $\theta_5$ may be provided with values that most effectively prevent intrusion from corner 930 into shield 910 by forming surface 920 to be substantially perpendicular to a line of entry of an intruding device into shield 910 from corner 930. In some implementations, surface 920 may also be rounded to conform to the shape of a rounded corner. Shield 910 having surface 920 is described in FIG. 9 with reference to metal shell 900. However, it is understood that shield 910 may be formed with surface 920 without metal shell 900 enclosing shield 910.

Scanning technology is often used to examine printed circuit boards and electronic devices. For example, X-rays are commonly used in circuit board manufacturing to inspect solder welds and joints of integrated circuits. Applying the same principles, X-ray devices could be used to identify locations of specific types of electronic devices on a printed circuit board. For example, an intruder equipped with an X-ray device may be able to identify a flash memory device that may store security keys or other sensitive information. The intruder may attempt to retrieve these security keys before controller 200 has the ability to detect the security breach, especially since controller 200 is likely provided on a different chip than the flash memory device.

The shield, as described above, includes traces made of two different types of plastic, conductive and non-conductive. The traces are arranged to prevent an attack by an external source that penetrates the shield. The properties of the plastic shield may also prevent detection by an external scanning device. In particular, the use of two different types of plastic to construct the traces may make the use of scanning technology impractical due to an almost imperceptible difference in the two materials.

Figure 10:
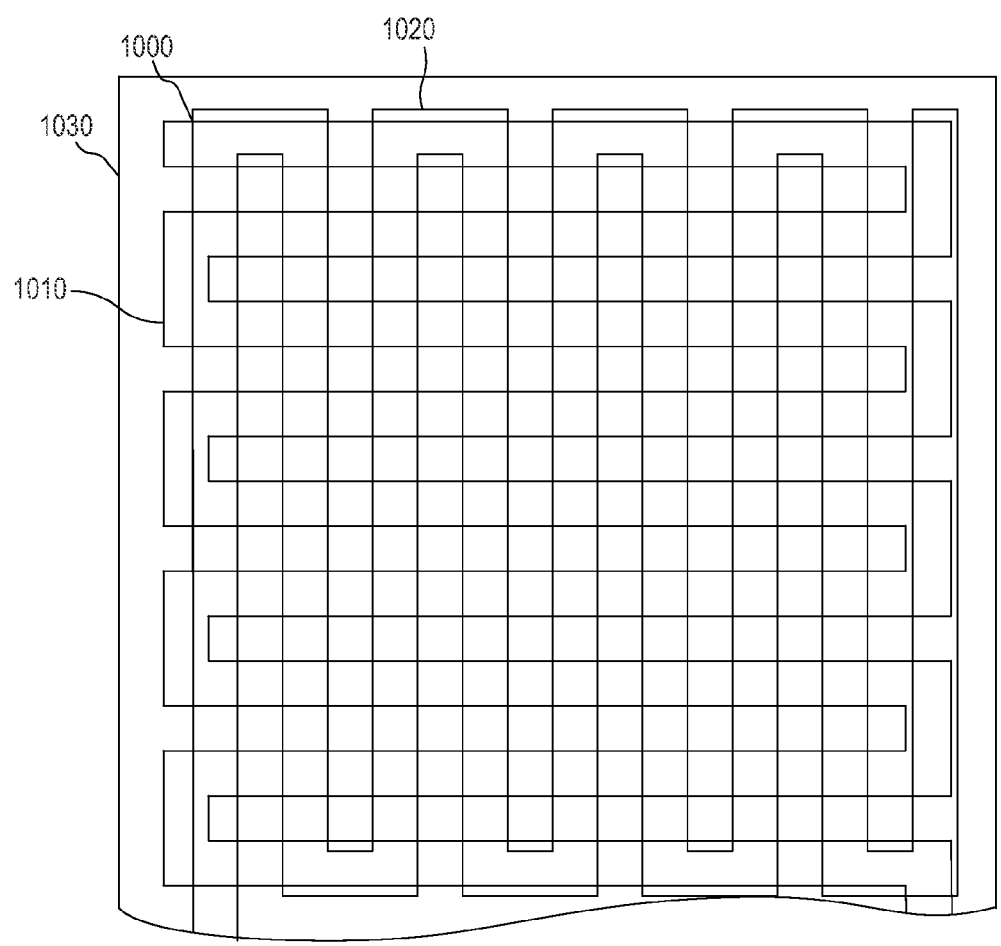
FIG. 10 illustrates example active traces and example decoy traces of an example shield provided over an example electronic device.

FIG. 10 illustrates example active traces 1010 and example decoy traces 1020 of an example shield 1000 provided over an example electronic device 1030. Even though FIG. 10 illustrates active traces 1010 as being provided in one layer and decoy traces 1020 as being provided in a different layer, it is understood that many additional layers of active traces 1010 and decoy traces 1020 may be provided in shield 1000.

Current may flow through active traces 1010 such that active traces 1010 are used to detect penetration by an external source into shield 1000. In an example embodiment, decoy traces 1020 have the ability to conduct current since decoy traces 1020 may be constructed with an inner conductive portion. However, no current may actually be caused to flow through decoy traces 1020. Accordingly, decoy traces 1020 may be constructed such that they appear no different than active traces 1010 either visually or under some other form of inspection. As a result, an intruder, equipped with an X-ray device, may attempt to detect the traces of shield 1000 but would not be able to differentiate between active traces 1010 and decoy traces 1020, In this case, since active traces 1010 and decoy traces 1020 appear to exhibit the same properties, a potential attacker may likely interpret decoy traces 1020 as something to avoid.

In one example embodiment, decoy traces 1020 are formed from a different material than active traces 1010. The material used to form decoy traces 1020 may be more visible under X-ray examination than the material used to form active traces 1010. For example, the material used to form decoy traces 1020 may be formed using a type of plastic that is similar to non-conductive portions of shield 1000, while active traces 1010 may be formed of material that is not detectable by an X-ray device. In this way, an attacker may be tempted to avoid penetrating decoy traces 1020 and may be caused to penetrate the undetected active traces 1010. Accordingly, an external source may be caused to penetrate active traces 1010 such that the intrusion of shield 1000 may be detected.

In another example embodiment, in order to further confuse an intruder, decoy traces 1020 may be caused to conduct current even though decoy traces 1020 may not be arranged to actually detect penetration of shield 1000 by an external source. In another example embodiment, current may be caused to flow through active traces 1010 and decoy traces 1020 at different times. In this case, active traces 1010 may behave as decoy traces when no current is flowing through active traces 1010. When no current flows through active traces 1010, active traces 1010 may not detect penetration of shield 1000 by an external source. Likewise, decoy traces 1020 may behave as active traces when current is caused to flow through decoy traces 1020. When current flows through decoy traces 1020, decoy traces 1020 may detect when an intruding device penetrates shield 1000. By frequently alternating which traces current flows through, a potential intruder would be unable to detect easily which traces are behaving as active traces and which traces are behaving as decoy traces at any given time. Accordingly, the intruders efforts to penetrate shield 1000 may be further thwarted.

Figure 11:
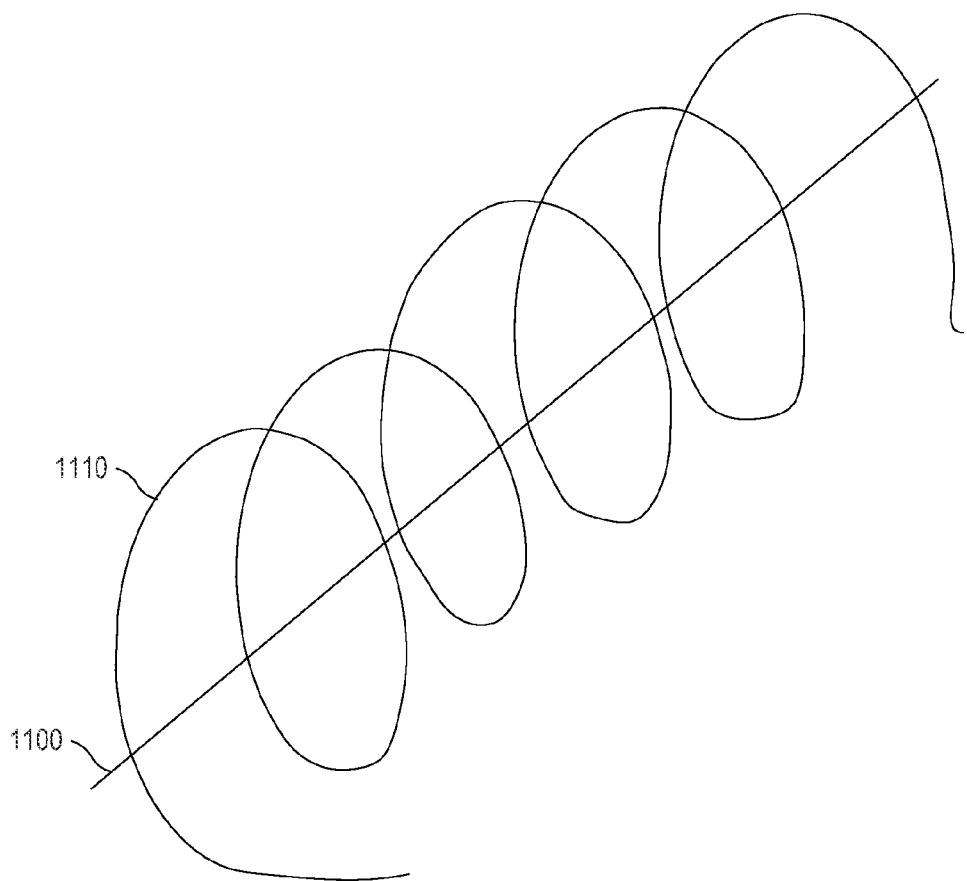
FIG. 11 illustrates an example active trace and an example decoy trace of an example shield for an electronic device.

FIG. 11 illustrates an example active trace and an example decoy trace of an example shield for an electronic device. Since three-dimensional printing techniques are not limited to creating traces in a plane, there is no limit as to a particular shape that the traces may take to form a shield for providing a security barrier to an electronic device. As shown in FIG. 11, an active trace 1100 may be shaped as a straight line and a decoy trace 1110 may be shaped as a spiral that surrounds active trace 1100. As stated above, current may be caused to flow through active trace 1100 and current may be prevented from flowing through decoy trace 1110. With this structure, an intruder's efforts to access active trace 1100 may be thwarted since it would be difficult for an intruding device to access active trace 1100 through the surrounding decoy trace 1110.

In one example embodiment, current may be prevented from flowing through active trace 1100 such that active trace 1100 behaves as a decoy trace, and current may be caused to flow through decoy trace 1110 such that decoy trace 1110 behaves as an active trace. In this embodiment, an intruder may be erroneously led to believe that the trace provided in the straight line is the active trace such that the intruder would mistake the spiral-shaped trace could be penetrated without causing memory 210 to be erased. However, since decoy trace 1110 is actually conducting current, any attempt to penetrate this trace to access the interior trace would result in memory 210 being erased.

The foregoing disclosure describes a number of example embodiments for a shield that provides an electronic device with a security barrier. In this manner, the embodiments disclosed herein enable the protection of data stored in memory of the electronic device by detecting intrusion from an external source.

I claim:

1. An apparatus for providing a security barrier, the apparatus comprising:
   a shield comprising a plurality of traces, wherein each trace comprises an inner portion and an outer portion, the inner portion comprising conductive plastic and the outer portion comprising non-conductive plastic, and wherein the plurality of traces is arranged such that the shield is shaped to enclose an electronic device, wherein the shield defines an air channel that supports air flow from external to the shield to an interior of the shield and vice versa, and the air channel includes multiple directional changes for the air flow;
   a metal shell enclosing the shield; and
   a thermally conductive material provided between the metal shell and the shield.

2. The apparatus of claim 1, further comprising pressure-sensitive material provided between the metal shell and the shield.

3. The apparatus of claim 1, further comprising electrically conductive material provided between the metal shell and the shield.

4. The apparatus of claim 1, wherein the metal shell comprises an edge from which two surfaces of the metal shell extend at ninety degrees relative to each other, a portion of the shield proximate the edge forming a surface that forms an angle with each of the two surfaces of the metal shell, wherein the angle is in a range of between thirty-five degrees and fifty-five degrees.

5. The apparatus of claim 1, wherein the metal shell comprises a corner from which three surfaces of the metal shell extend at ninety degrees relative to each other, a portion of the shield proximate the corner having a surface that forms an angle with each of the three surfaces of the metal shell, wherein the angle is in a range of between thirty-five degrees and fifty-five degrees.

6. A system comprising:
   an electronic device comprising memory;
   a shield comprising a plurality of traces, wherein each trace comprises a conductive plastic inner portion and a non-conductive plastic outer portion, the plurality of traces being arranged such that the shield encloses the electronic device, wherein the shield defines an air channel that supports air flow from external to the shield to an interior of the shield and vice versa, and the air channel includes multiple directional changes for the air flow; and
   a plurality of decoy traces, wherein a first current is caused to flow through the plurality of traces, and a second current is caused to flow through the plurality of decoy traces.

7. The system of claim 6, wherein at least some of the traces are shaped as a spiral, and wherein at least some of the decoy traces extend along a center line of the spiral.

8. The system of claim 6, wherein at least some of the decoy traces are shaped as a spiral, and wherein at least some of the traces extend along a center line of the spiral.

9. The system of claim 6, wherein the plurality of traces is coupled to the electronic device, and in response to detecting penetration by a source external to the shield, the memory is caused to be erased.

10. The system of claim 6, wherein the plurality of traces is generated using three-dimensional printing.

* * * * *